United States Patent
Li

(10) Patent No.: US 8,159,613 B2
(45) Date of Patent: Apr. 17, 2012

(54) METHOD FOR SETTING CAPTION WINDOW ATTRIBUTES AND ASSOCIATED TELEVISION SYSTEM

(75) Inventor: Cheng Hao Li, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 739 days.

(21) Appl. No.: 12/343,761

(22) Filed: Dec. 24, 2008

(65) Prior Publication Data
US 2009/0161013 A1 Jun. 25, 2009

(30) Foreign Application Priority Data
Dec. 25, 2007 (TW) ................... 96150038 A

(51) Int. Cl.
H04N 7/00 (2006.01)
H04N 9/74 (2006.01)
H04N 9/76 (2006.01)
H04N 5/445 (2006.01)

(52) U.S. Cl. ......... 348/564; 348/468; 348/589; 348/600

(58) Field of Classification Search .................. 348/468, 348/564, 569, 599, 600, 624, 649, 651, 708, 348/717; 345/600, 604, 605; 382/167, 176; 715/275

See application file for complete search history.

(56) References Cited

U.S. PATENT DOCUMENTS

| 5,574,836 | A * | 11/1996 | Broemmelsiek | 345/427 |
| 6,630,966 | B1 * | 10/2003 | Tournier | 348/569 |
| 6,891,539 | B1 * | 5/2005 | Maruyama et al. | 345/629 |
| 7,221,381 | B2 * | 5/2007 | Brown Elliott et al. | 345/690 |
| 7,643,032 | B2 * | 1/2010 | Wetzel et al. | 345/582 |
| 7,647,620 | B2 * | 1/2010 | Van Der Meer et al. | 725/151 |
| 2003/0227565 | A1 * | 12/2003 | Hamilton et al. | 348/468 |
| 2006/0204086 | A1 * | 9/2006 | Gargi | 382/166 |
| 2007/0198932 | A1 * | 8/2007 | Uchimura | 715/723 |

* cited by examiner

Primary Examiner — Victor Kostak
(74) Attorney, Agent, or Firm — WPAT, P.C.

(57) ABSTRACT

A method for setting caption window attributes and an associated television system are concerned. The method includes steps of providing a plurality of attributive bit sets corresponding to a plurality of pixels in a caption; utilizing a window condition to compare the plurality of attributive bit sets in response to a setting caption window attribute command for changing window color to a destination color-change value, so as to selectively update partial bits of the attributive bit sets in response to the window condition; and displaying colors of the pixels according to the attributive bit sets and a palette, thereby changing the color of the caption window.

17 Claims, 3 Drawing Sheets

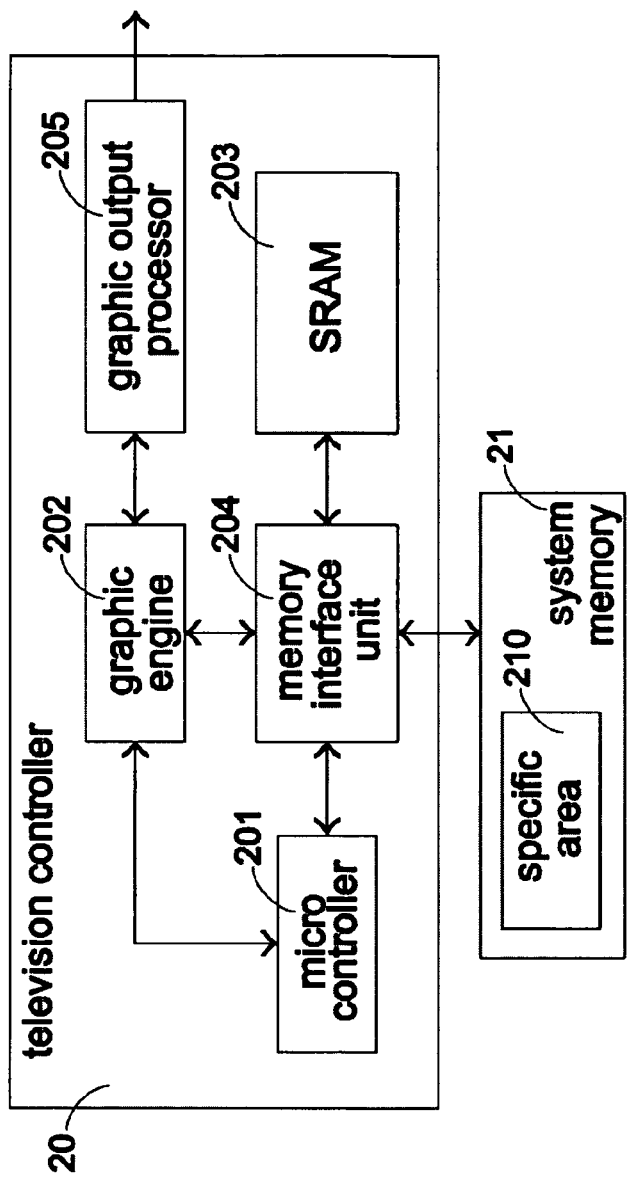

METHOD FOR SETTING CAPTION WINDOW ATTRIBUTES AND ASSOCIATED TELEVISION SYSTEM

FIELD OF THE INVENTION

The present invention relates to setting caption window attributes, and more particularly, to a method for setting caption window attributes for a digital television and an associated television system.

BACKGROUND OF THE INVENTION

Accompanied with increasing global digitalization of television programs, demands of digital televisions are inevitably expanding day by day. Current digital televisions are divided into two main-stream categories, namely the European Digital Video Broadcasting (DVB) standard, and the American ATSC standard. American digital television specifications have an especially defined captioning standard, Digital Television Closed Captioning (DTVCC), for hearing-impaired individuals. Under a mute condition, apart from showing dialogues between characters, DTVCC also displays descriptive sentences on elements occurring on the screen. For example, descriptive sentences are displayed when there are background sounds on the screen to help hearing-impaired individuals to better understand the plot.

Video signals sent out by a DTV service provider or output from a DVD player reading a DVD containing closed captioning, are attached with the aforesaid DTVCC, which is displayed on a screen by way of a built-in closed captioning decoding device in an ATSC digital television. According to prior art, a closed caption decoding device is achieved using a special chip independently provided outside of a micro processing unit and a graphic engine. Beneficial from improved performance of a television controller having a micro processing unit and a graphic engine in a digital television, the decoding operation above can be completed with software executed by the television controller.

Referring to FIG. 1 showing a schematic diagram of a screen 10 showing a closed caption, CC708 of ATSC standards specifies that color index may be used to define colors of three targets, which are a foreground 11, a background 12 and a window 13. Each of the targets must be able to support at least 8 different colors or even more. Therefore, in a static random access memory (SRAM) of a television controller, a color index of prior art occupies at least 3×8=24 units to store color values of the foreground, background and window, where an actual size of the units is dependent on actual color types supported. Suppose each unit needs a length of three bits to complete a so-called palette and meet CC708 requirements, the demand of SRAM as well as hardware costs are increased. However, SRAM not only requires special processing procedures but also takes over a substantial amount of circuitry area. In addition, in prior art, when using set window attributes (SWA) for changing the color of the window 13 to another destination color, high-performance hardware is necessary for executing an enormous amount of algorithm, meaning that a higher-end micro processing unit and a large random access memory (RAM) are also needed in order to produce a picture in the destination color and having a same size as that of the window 13, while significant hardware resources are used to cover the foreground 11 and the background 12. In conclusion, the enormous amount of algorithm leads to excessive hardware demand further causing increase in power consumption and costs. Therefore, it is primary of the invention to overcome the various specified shortcomings of prior art.

SUMMARY OF THE INVENTION

Therefore, the present invention discloses a method for setting caption window attributes for use in a television system having a palette. The method comprises steps of providing a plurality of attributive bit sets corresponding to a plurality of pixels in a caption; utilizing a window condition to compare the plurality of attributive bit sets in response to a setting caption window attribute command for changing window color to a destination color-change value, so as to selectively update partial bits of the attributive bit sets in response to the window condition; and displaying colors of the pixels according to the attributive bit sets and the palette, thereby changing the color of the caption window. The television system comprises a television controller and a dynamic random access memory (DRAM). The palette is stored in a static random access memory (SRAM) in the television controller, and the video data representing the caption is stored in the DRAM.

The present invention further discloses a television system comprising a system memory for storing a plurality of attributive bit sets corresponding to a plurality of pixels in a caption; a television controller built-in with an SRAM for storing a palette, coupled to the system memory, and for comparing the plurality of attributive bit sets in the memory system in response to a setting caption window attribute command for changing window color to destination color-change values, so as to selectively update partial contents of the attributive bit sets to the destination color-change values in response to a window condition, and output color values of the pixels corresponding to the attributive bit sets and the palette; and a display panel coupled to the television controller, and for receiving the color values for display.

BRIEF DESCRIPTION OF THE DRAWINGS

The present invention will become more readily apparent to those ordinarily skilled in the art after reviewing the following detailed description and accompanying drawings, in which:

FIG. 2 is a block diagram showing a television system capable of setting closed caption window attributes according to one embodiment of the invention.

FIG. 3 is a schematic diagram showing an exemplary format for pixel attributes according to one embodiment of the invention.

DETAILED DESCRIPTION OF THE PREFERRED EMBODIMENT

Figure 1:
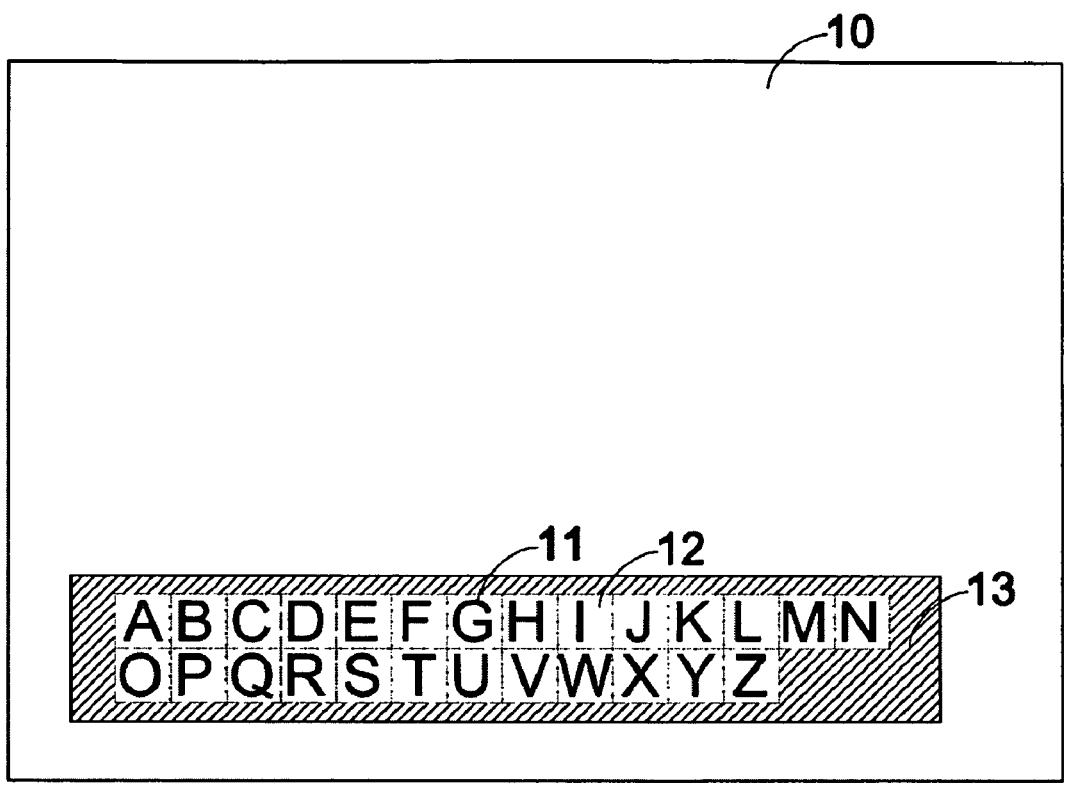
FIG. 1 is a schematic diagram of a closed caption shown on a screen.

Referring to FIG. 2 showing a schematic diagram of a function block of a television system capable of setting caption window attributes according to the invention, the television system comprises a television controller 20, and a system memory 21 provided outside of the television controller 20. The television controller 20 includes a micro controller 201, a graphic engine 202, a static random access memory (SRAM) 203, a memory interface unit 204, and a graphic output processor 205. The graphic engine 202 produces a set of video data for a caption to be displayed on a screen. The set of video data comprises a plurality of attributive bit sets corresponding to m×n number of pixels, with the plurality of attributive bit sets being written into a specific area 210 in the system memory 21. For instance, suppose the caption is a rectangle of m×n pixels and each attributive bit set is represented by sixteen bits, the size of the specific area 210 in the system memory 21 is m×n×16 bits. To comply with color index specification of CC708, it is necessary for the SRAM 203 in the television controller 20 to provide space for storing color values. Taking three targets, a foreground, a background and a window for instance, when each of the targets is to support at least 8 colors, according to prior art, at least 3×8=24 units in the SRAM 203 are used to store RGB values. Wherein, each unit stores a palette of the three primary colors R, G, B, and a size of each unit depends on complexity of colors supported by the controller 20. Prior art has not yet studied how to save memory space.

In this embodiment, an unprecedented solution is provided by changing formats of the sixteen-bit data representing pixels in the system memory 21. FIG. 3 shows attributes of pixels are represented using a color index mode, which is also referred to as the 1ABFgBg mode, or the 12355 mode. 1 bit (B0), 2 bits (B1-B2), 3 bits (B3-B5), 5 bits (B6-B10), and 5 bits (B11-B15) represent a color value format, alpha, blink, a foreground index, and a background index, respectively. In this embodiment, when the bit representing the color value format is 1, it means that the segment of data or pixels is in color index mode (1ABFgBg mode). When the bit representing the color value format is 0, it means that the segment of data or pixels is in RGB mode (0RGB mode), where 5 bits are used to represent numbers of R, G, B color values.

Color index mode (1ABFgBg mode) is to be further explained. 3 bits (B3-B5) representing blink, 5 bits (B6-B10) representing the foreground index, and 5 bits (B11-B15) representing the background index comply with an original definition of CC708 standard. The 3 bits representing a blink status is for indicating whether the pixels are to be displayed by the foreground index or background index, and to express other information such as whether or not to proceed with blink. Therefore, when the graphic output engine 205 fetches the sixteen-bit attributive bit sets in the specific area 210 in the system memory 21 to output video, in the event that the bit, which represents the color value format, in the sixteen-bit attributive bit sets in 1ABFgBg mode corresponding to a particular pixel, is 1, an indicative bit (B3, for example) for foreground/background from the 3 bits representing blink is examined to determine whether the pixel is to be displayed using foreground or background. For instance, when the indicative bit value (1, for example) for foreground/background indicates that the pixel is to be shown as foreground, the graphic engine 202, based upon the 5-bit foreground index (B6-B10, or 3 from the 5 bits are needed, supposing the hardware only needs to support 8 colors) locates the RGB values corresponding to the foreground index from the SRAM 203 to proceed with subsequent processing. On the other hand, when the indicative bit value (0, for example) for foreground/background indicates that the pixel is to be shown as background, the graphic engine 202, based upon the 5-bit background index (B11-B15, or 3 from the 5 bits are needed, supposing the hardware only needs to support 8 colors) locates the RGB values corresponding to the background index that is separate from the foreground index from the SRAM 203 to proceed with subsequent processing.

In this embodiment, to effectively reduce space occupied by palettes of color indices in the SRAM 203, it is preferred that the window color index share a same color index table with the background index or the foreground index. For instance, when the window color index is designed to share the background index table with the background index, such as, the system fills B11-B15 representing a certain pixel with 5 bits representing the window color index, and by setting the foreground/background indicative bit, the certain pixel on a monitor is allowed to display RGB values corresponding to the window color index according to the background index table.

Thus, to display pixels representing window color in the closed caption as well as pixels representing the background color of the closed caption, the system looks up a same color index table in the palette to show corresponding RGB values. As a result, a size of the palette in the SRAM 203 can be reduced by ⅓ while specification requirements are met by providing two color index tables each having 8 RGB values.

Further, the embodiment below discloses steps below for changing window color to another color using a window attributive setting command.

When the micro processing unit 201 receives a command for changing window color, a color-change value representing a destination color index is first parsed from the command, followed by rapidly removing the background by the graphic engine 202 commanded using a destination color key, such that partial bits of partial attributive bit sets from the attributive bit sets are updated to the color-change value in response to a window condition. More specifically, the graphic engine 202 compares the m×n sixteen-bit attributive bit sets in the specific area 210 in the system memory 21 to identify pixels associated with window color to change the color thereof. Therefore, in order to effectively distinguish whether the pixels associated with the window color rather than wrongly changing the foreground color as well, the embodiment applies one from sixteen bits to express a difference between the window color and the other two. Preferably, since that the need for alpha is undemanding in actual closed captioning applications, only 1 bit may be used to represent alpha attribute of pixels while the remaining 1 bit, which is referred to as the window color value bit such as B2 in FIG. 3, originally representing alpha is utilized to represent whether the pixels are displayed using window color. For example, when the window color value bit in a sixteen-bit attributive bit set corresponding to a pixel is 1 as the aforesaid window condition, it means that the pixel associates with the window. The graphic engine 202 then identifies the pixels belonging to the window from the m×n sixteen-bit values in the specific area 210 in the system memory 21, and updates contents at B11-B15 of the sixteen-bit values of the pixels associated with the window using the destination color index (parsing a destination color index from the command, such as the third color out of eight colors). Accordingly, when the graphic output processor 205 fetches the sixteen-bit values in the specific area 210 in the system memory 21 to output video to a display panel (not shown), the pixels at the window are rapidly changed to the destination color for window color change. Considering the need of current specifications of digital television standards to support 8 windows, the embodiment allows rapid window color changing processes with respect to multiple windows and alleviates hardware loading as well as hardware equipment requirement.

Figure 4:
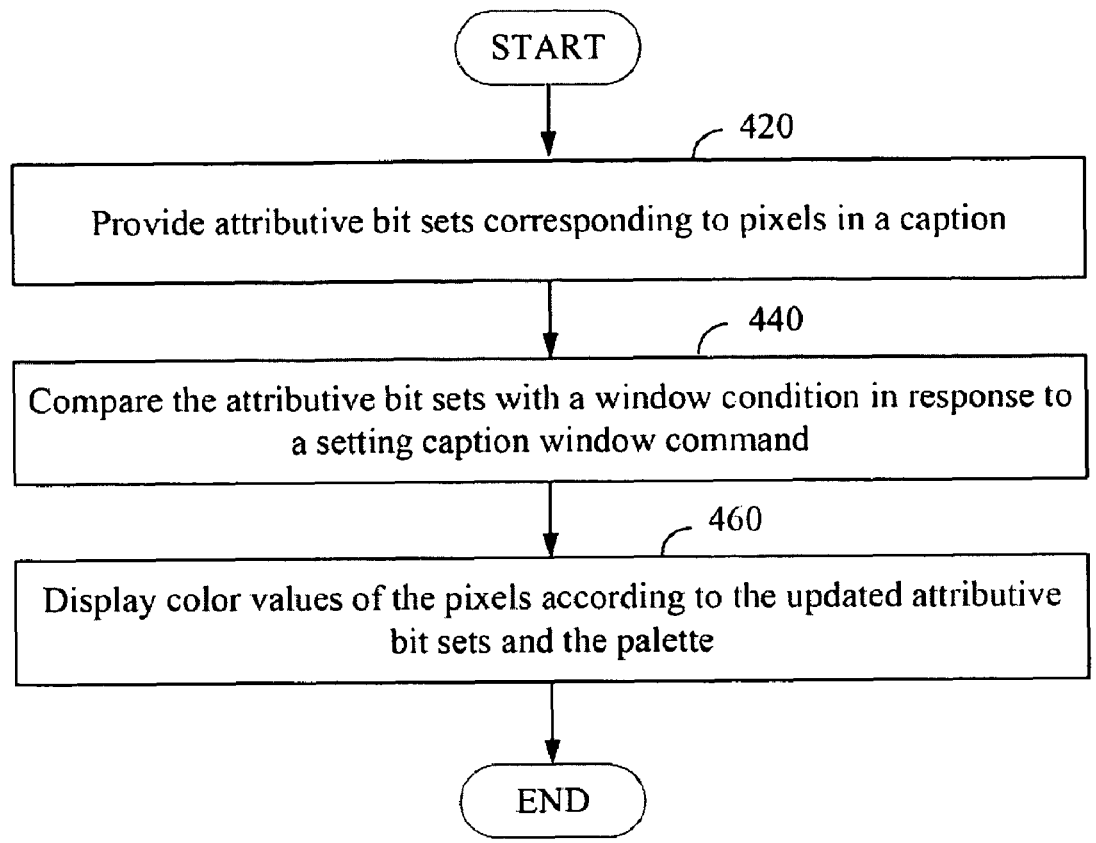
FIG. 4 shows a method for setting caption window attributes for use in a television system having a palette according to one embodiment of the invention.

FIG. 4 shows a method for setting caption window attributes for use in a television system having a palette according to one embodiment of the invention. At step 420, a plurality of attributive bit sets corresponding to a plurality of pixels in a caption are provided. At step 440, compare the attributive bit sets utilizing a window condition in response to a setting caption window command for changing window color to a destination color-change value, so as to selectively update partial bits of the attributive bit sets to the color-change target value in response to the window condition. At step 460, display a plurality of color values of the pixels according to the updated attributive bit sets and the palette to change the color of the caption window effectively, with reduced memory space. Preferably, determine whether a foreground/background indicative bit denotes the foreground is to be used, and look up a color value corresponding to the foreground index from the foreground index table according to the foreground index. Preferably, determine whether the foreground/background indicative bit denotes the background is to be used, and looking up a color value corresponding to the background index from the background index table according to the background index. Preferably, determine whether a foreground/background indicative bit denotes the foreground is to be used, and looking up a color value corresponding to the foreground index from the foreground index table according to the foreground index. Preferably, determine whether the foreground/background indicative bit denotes the background is to be used, and looking up a color value corresponding to the background index from the background index table according to the background index.

Conclusive from the above, without using enormous graphic computations, the invention completes window color changing while avoiding shortcomings of high hardware requirement, costs and power consumption. Further, the practice of sharing color index tables disclosed by the invention also effectively reduces space occupied by the palette in the SRAM 203 in the television controller 20 to achieve the primary object of the invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for setting caption window attributes for use in a television system having a palette, comprising steps of:
   providing a plurality of attributive bit sets corresponding to a plurality of pixels in a caption;
   comparing the attributive bit sets by utilizing a window condition in response to a setting caption window command for changing window color to a destination color-change value, so as to selectively update partial bits of the attributive bit sets to the color-change target value in response to the window condition; and
   displaying a plurality of color values of the pixels according to the updated attributive bit sets and the palette;
   wherein each of the pixels in the caption includes three targets namely a foreground index, a background index and a window color index; the palette includes a foreground index table, and a background index table; and the window color index and the foreground index share the foreground index table.

2. The method for setting caption window attributes according to claim 1, wherein the television system comprises a television controller and a dynamic random access memory (DRAM), the palette is stored in a static random access memory (SRAM) in the television controller, and the attributive bit sets in the caption are stored in the DRAM.

3. The method for setting caption window attributes according to claim 1, wherein the caption includes m×n pixels, and a format of the attributive bit sets corresponding to the pixels is in a color index mode.

4. The method for setting caption window attributes according to claim 3, wherein the color index mode uses 1 bit, 2 bits, 3 bits, 5 bits, and 5 bits to represent a color value format, alpha, blink, a foreground index, and a background index, respectively.

5. The method for setting caption window attributes according to claim 4, wherein the window condition is asserted by setting 1 bit of the alpha's 2 bits.

6. The method for setting caption window attributes according to claim 1, wherein the pixels in the caption have n targets, the palette has n−1 color indices, and two specific targets from the n targets share a same color index.

7. The method for setting caption window attributes according to claim 1, wherein each of the pixels in the caption includes three targets namely a foreground index, a background index and a window color index; the palette includes a foreground index table and a background index table; and the window color index and the background index share the background index table.

8. The method for setting caption window attributes according to claim 7, wherein partial bits of each of the attributive bit sets are filled in with the window color index or the background index.

9. The method for setting caption window attributes according to claim 8, wherein the displaying step comprises steps of:
   determining whether a foreground/background indicative bit denotes the foreground is to be used, and looking up a color value corresponding to the foreground index from the foreground index table; and
   determining whether the foreground/background indicative bit denotes the background is to be used, and looking up a color value corresponding to the background index from the background index table.

10. The method for setting caption window attributes according to claim 1, wherein selectively updating partial bits of each of the attributive bit sets are filled in with the window color index or the foreground index.

11. The method for setting caption window attributes according to claim 10, wherein the displaying step comprises steps of:
   determining whether a foreground/background indicative bit denotes the foreground is to be used, and looking up a color value corresponding to the foreground index from the foreground index table; and
   determining whether the foreground/background indicative bit denotes the background is to be used, and looking up a color value corresponding to the background index from the background index table.

12. A television system for reducing caption memory, comprising:
   a system memory, including a plurality of attributive bit sets corresponding to a plurality of pixels in a caption;
   a television controller, built-in with an SRAM for storing a palette, coupled to the system memory, and for comparing the plurality of attributive bit sets in response to a setting caption window attribute command for changing window color to a destination color-change value, so as to selectively update partial bits of the attributive bit sets to the destination color-change value in response to a window condition, and output color values of the pixels corresponding to the attributive bit sets and the palette; and a display panel, coupled to the television controller, and for receiving the color values for display;

wherein each of the pixels in the caption includes three targets namely a foreground index, a background index, and a window color index; the palette includes a foreground index table and a background index table; and the window color index and the back round index share the back round index table.

13. The television system according to claim 12, wherein the system memory is a DRAM, the caption includes m×n pixels, a format of the attributive bit sets corresponding to the pixels is in a color index mode, and the color index mode uses 1 bit, 2 bits, 3 bits, 5 bits, and 5 bits to represent a color value format, alpha, blink, a foreground index, and a background index, respectively.

14. The television system according to claim 13, wherein the window condition is asserted by setting 1 bit of the alpha's 2 bits.

15. The television system according to claim 12, wherein the pixels in the caption has n targets, the palette has n−1 color indices, and two specific targets from the n targets share a same color index.

16. The television system according to claim 12, wherein selectively updating partial bits of each of the attributive bit sets are filled in with the window color index or the background index.

17. The television system according to claim 12, comprising:

a micro processing unit, for receiving a window color-change command and parsing the destination color-change value from the command;

a graphic output processor, for fetching the attributive bit sets stored in the system memory for video output; and a graphic engine, coupled to the micro processing unit and the graphic output processor, for producing the attributive bit sets to be displayed in the caption on the screen, comparing the attributive bit sets in the system memory in response to the destination color-change value from the micro processing unit, updating the partial bits of the partial attributive bit sets to the destination color-change value in response to the window condition, and utilizing the corresponding attributive bit sets and palette to provide color values of the pixels in the caption to the graphic output processor for output.

* * * * *